Garet G. Heermance's Improved Device for Locking the Nuts of Screws.

99315

PATENTED FEB 1 1870

Witnesses:
Elbridge G. Studley
Herman J. Heermance

Inventor
Garet G. Heermance

United States Patent Office.

GARET G. HEERMANCE, OF CLAVERACK, NEW YORK.

Letters Patent No. 99,315, dated February 1, 1870.

---

IMPROVEMENT IN LOCK-NUTS.

---

The Schedule referred to in these Letters Patent and making part of the same.

---

I, GARET G. HEERMANCE, of the town of Claverack, in the county of Columbia, and State of New York, have invented certain Improvements in the Devices of Locking the Nuts of Screws, of which the following is a specification.

Nature and Object of the Invention.

The first part of my invention relates to the combination of a pointed setting-screw and the nut of a screw, in such a manner that the said pointed setting-screw locks the nut of a screw at any required place or point.

The second part of my invention relates to the combination of a movable and pointed piece of metal and the nut of a screw, in such manner that the said piece of movable and pointed metal, being forced down permanently and continuously by a setting-screw, locks the nut of a screw at any required place or point.

Description of the Accompanying Drawings.

General Description.

Figure 1:
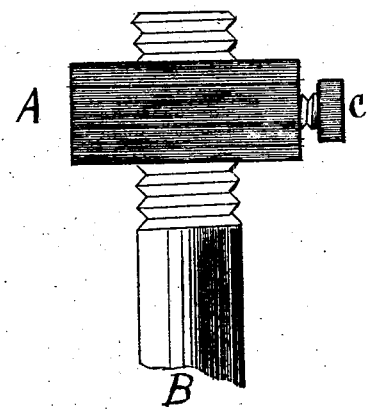
Figure 1 is an elevation of a screw, B, with nut, A, and the locking-screw C, embodying my invention.

I make the screw B, fig. 1, as it is now made, and I also make its nut A, fig. 1, as it is now made. I then drill a hole, perpendicularly or diagonally, of any required diameter, through the side of the nut A, fig. 1, to its hole, and I then cut a screw-thread in said hole, and then I put the locking-screw C, fig. 3, having a corresponding thread cut thereon, and then I screw it down until its sharp point impinges upon the screw B, fig. 2, between its threads, to lock its nut A, fig. 1, at the required place or point.

Figure 2:
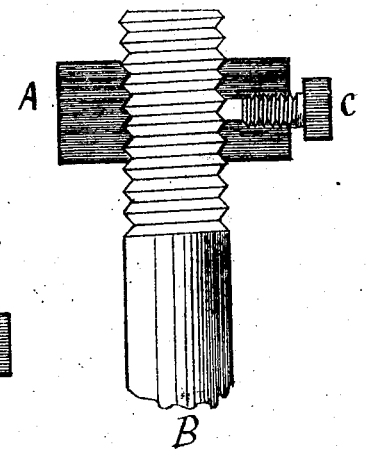
Figure 2 is a section of a nut, A, and also showing the screw B and the locking-screw C.

When I wish to move the nut A, fig. 1, I unlock it by unscrewing sufficiently the locking-screw C, figs. 1 and 2.

Figure 3:
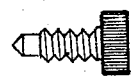
Figure 3 is a view of the locking-screw C, shown at C, figs. 1 and 2.

I make the head of the locking-screw C, fig. 3, of different shape or form, as the heads of adjustable or setting-screws are now made.

I make the point of the locking-screw C, fig. 3, so pointed that it will pass more or less between the threads of screw B, fig. 2.

Figure 4:
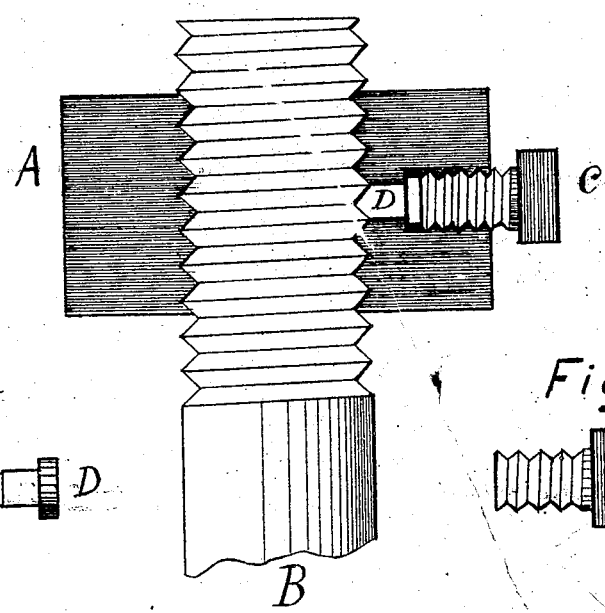
Figure 4 is another section of nut A, showing the screw B, the locking-screw C, and the movable point D.
Figure 5:
Figure 5 represents the movable point D, shown at D, fig. 4.
Figure 6:
Figure 6 represents the locking-screw C, shown at fig. 4.

When I lock a large nut, I sometimes drill a hole perpendicularly through the nut A, fig. 4, about three-fourths of its thickness, and of the diameter required for the locking-screw C, fig. 6. I then cut a screw-thread in said hole, to receive the locking-screw C, fig. 6. I then drill a hole of less diameter through the remaining part of the nut A, fig. 4, and put therein the movable point D, fig. 5, to be forced down by the locking-screw C, fig. 4, to lock nut A, fig. 4, substantially as and for the purpose hereinbefore set forth.

I make the movable point D, fig. 5, with a flange, so that when I put it in its place, fig. 4, and I screw the locking-screw C, fig. 6, into its place, fig. 4, the said movable point D, fig. 4, cannot fall out when the nut A, fig. 4, is unlocked and removed from screw D, fig. 4.

I claim, as my invention—

1. The combination of the pointed locking-screw C and the nut A, substantially as and for the purpose herein set forth.

2. The combination of the nut A with the movable and pointed piece D and the locking-screw C, substantially as and for the purpose herein set forth.

GARET G. HEERMANCE.

Witnesses:
ELBRIDGE G. STUDLEY,
HERMAN C. HEERMANCE.